(12) United States Patent
Kim et al.

(10) Patent No.: US 9,886,429 B2
(45) Date of Patent: Feb. 6, 2018

(54) METHOD AND APPARATUS FOR MAKING CONTENTS THROUGH WRITING INPUT ON TOUCH SCREEN

(71) Applicant: Samsung Electronics Co., Ltd., Suwon-si, Gyeonggi-do (KR)

(72) Inventors: Do-Hyeon Kim, Suwon-si (KR); Hee-Bum Ahn, Seoul (KR); Won-Suk Chang, Hwaseong-si (KR); Seong-Taek Hwang, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 14/186,805

(22) Filed: Feb. 21, 2014

(65) Prior Publication Data

US 2014/0245137 A1    Aug. 28, 2014

(30) Foreign Application Priority Data

Feb. 22, 2013  (KR) .......................... 10-2013-0019338
Feb. 18, 2014  (KR) .......................... 10-2014-0018525

(51) Int. Cl.
*G06F 17/00*  (2006.01)
*G06F 17/24*  (2006.01)
*G06F 3/0483*  (2013.01)
*G06F 3/0488*  (2013.01)

(52) U.S. Cl.
CPC ............ *G06F 17/24* (2013.01); *G06F 3/0483* (2013.01); *G06F 3/04883* (2013.01); *G06F 17/241* (2013.01); *G06F 17/242* (2013.01)

(58) Field of Classification Search
CPC ...... G06F 17/24; G06F 17/241; G06F 17/242; G06F 3/0483; G06F 3/04883; G06F 3/0481; G06F 3/03545; G06F 3/0416
USPC ................................. 715/863–864, 268–271
See application file for complete search history.

(56) References Cited

U.S. PATENT DOCUMENTS

| 4,727,588 | A | * | 2/1988 | Fox ......................... G06K 9/222 345/173 |
| 5,528,743 | A | | 6/1996 | Tou et al. |
| 5,666,139 | A | * | 9/1997 | Thielens ................. G06F 17/24 345/173 |
| 8,094,941 | B1 | * | 1/2012 | Rowley ............... G06F 3/04883 382/186 |

(Continued)

FOREIGN PATENT DOCUMENTS

| CN | 102855082 A | 1/2013 |
| CN | 104007925 A | 8/2014 |

(Continued)

*Primary Examiner* — Quoc A Tran
(74) *Attorney, Agent, or Firm* — Jefferson IP Law, LLP

(57) ABSTRACT

A method of writing content through a writing input on a touch screen is provided. The method includes displaying written input content according to a writing input detection and identifying whether there is a proofreading mode control, and when there is the proofreading mode control, entering a proofreading mode, displaying the written input content according to the writing input detection, identifying a proofreading mark in the written input content, and applying an editing content corresponding to the proofreading mark, so as to proofread the written content.

22 Claims, 18 Drawing Sheets

(a)

(b)

(56) References Cited

U.S. PATENT DOCUMENTS

| | | | | |
|---|---|---|---|---|
| 2002/0002459 A1* | 1/2002 | Lewis | ............... | G06F 17/273 |
| | | | | 704/260 |
| 2006/0291727 A1* | 12/2006 | Bargeron | ............... | G06Q 10/10 |
| | | | | 382/218 |
| 2007/0040813 A1* | 2/2007 | Kushler | ............... | G06F 3/0237 |
| | | | | 345/173 |
| 2008/0019591 A1 | 1/2008 | Iwayama et al. | | |
| 2012/0327105 A1* | 12/2012 | Rowley | ............... | G06F 3/04883 |
| | | | | 345/619 |

FOREIGN PATENT DOCUMENTS

| | | |
|---|---|---|
| KR | 10-0160695 B1 | 8/1998 |
| KR | 10-2009-0023915 A | 3/2009 |

* cited by examiner

| PROOFREADING MARK | FUNCTION |
|---|---|
| ∨ | INSERT |
| ◯ | REPLACE |
| ⌐ | INDENT |
| ⌐ | OUTDENT |
| ⌒ | TAKE OUT SPACE |
| / | INSERT SPACE |
| ⌐ | INSERT |
| ⋮ | ⋮ |

FIG.14

METHOD AND APPARATUS FOR MAKING CONTENTS THROUGH WRITING INPUT ON TOUCH SCREEN

CROSS-REFERENCE TO RELATED APPLICATION(S)

This application claims the benefit under 35 U.S.C. §119(a) of a Korean patent application filed on Feb. 22, 2013 in the Korean Intellectual Property Office and assigned Serial number 10-2013-0019338, and of a Korean patent application filed on Feb. 18, 2014 and assigned Serial number 10-2014-0018525, the entire disclosure of each of which is hereby incorporated by reference.

TECHNICAL FIELD

The present disclosure relates to a technology for providing a user interface environment using a touch screen. More particularly, the present disclosure relates to a method and an apparatus for creating contents through a writing input on a touch screen.

BACKGROUND

Portable terminals that are manufactured to be carried by a user, such as a smart phone, a Portable Multimedia Player (PMP), an MP3 player, a tablet Personal Computer (PC), a navigation device, a portable game machine, and the like, do not include four-directional buttons for movement (e.g., up/down/left/right) due to a limited size thereof Instead, portable terminals include an input device (i.e., a touch screen) through which the user can make a screen touch input to provide a user interface.

A user interface scheme using the touch screen detects a touch input that is made by a user's finger or an electronic pen. A touch input method includes a contact type touch input made by a contact with a user's body or a touchable input means (e.g., an electronic pen) and a non-contact type input such as hovering. The contact type touch input method provides a convenient user interface. For example, the contact type touch input using the electronic pen provides for a more accurate touch input in comparison with the contact type touch input using the finger. Accordingly, the contact type touch input using the electronic pen can be more usefully applied to an application related to a writing input, a sketch, or the like.

A content (e.g., a memo, a message, a general document, and the like) writing method using the writing input provides more freedom when writing the content, is more intuitive, and allows for a more rapid input in comparison with a content writing method using a keyboard input. Thus, the utilization thereof is significantly increasing due to the improvement of a character recognition technology for the written content.

However, in the content writing method through the writing input, the content which is being written (or has been written) is generally processed as an image file or is processed as a text file through the character recognition, and a technology for editing the content has remained at a level that provides only simple proofreading mainly based on the recognized character. Thus, there exists a need for an apparatus and method that provides an editing function which the user can use more easily.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for writing content through a writing input on a touch screen which are more useful for a user and provide an editing function which the user can use more easily.

Another aspect of the present disclosure is to provide a method and an apparatus for writing content through a writing input on a touch screen which provide an editing function.

In accordance with an aspect of the present disclosure, a method of writing content through a writing input on a touch screen is provided. The method includes displaying written input content according to a writing input detection and identifying whether there is a proofreading mode control, and, when there is the proofreading mode control, entering a proofreading mode, displaying the written input content according to the writing input detection, identifying a proofreading mark in the written input content, and applying an editing content corresponding to the proofreading mark, so as to proofread the written content.

The entering of the proofreading mode may include displaying the written input content according to the writing input detection, identifying whether there is a matching proofreading mark among proofreading marks in the written input, proofreading a current written input content according to a proofreading function corresponding to the identified proofreading mark and the written content to be proofread, and displaying the proofread written input content.

The identifying of whether there is the matching proofreading mark may include identifying N strokes as the proofreading mark when entering a proofreading mode.

The proofreading mark may include at least one of an "insertion proofreading mark" indicating a content insertion, a "replacement proofreading mark" indicating a content replacement, a "slope proofreading mark" indicating proofreading of a slope of a part corresponding to a character string including a plurality of characters in the written content, and a "paragraph alignment proofreading mark" indicating a paragraph alignment.

The proofreading mode control may correspond to selection of a menu item from a menu bar on a screen for a writing input to enter the proofreading mode, or an input of a control button of an electronic pen or input maintenance of the control button of the electronic pen.

As described above, a method of writing content through a writing input on a touch screen according to the present disclosure is more useful for a user and may provide an editing function based on the writing input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 14 illustrates a table recording proofreading mark information when content is written through a writing input on a touch screen according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
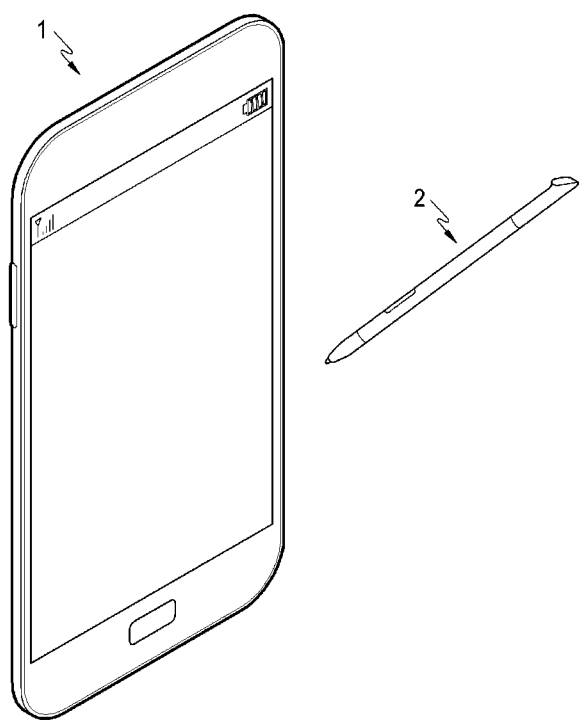
FIG. 1 is a perspective view schematically illustrating a content writing apparatus according to an embodiment of the present disclosure.

FIG. 1 is a perspective view schematically illustrating a content writing apparatus according to an embodiment of the present disclosure.

Figure 2:
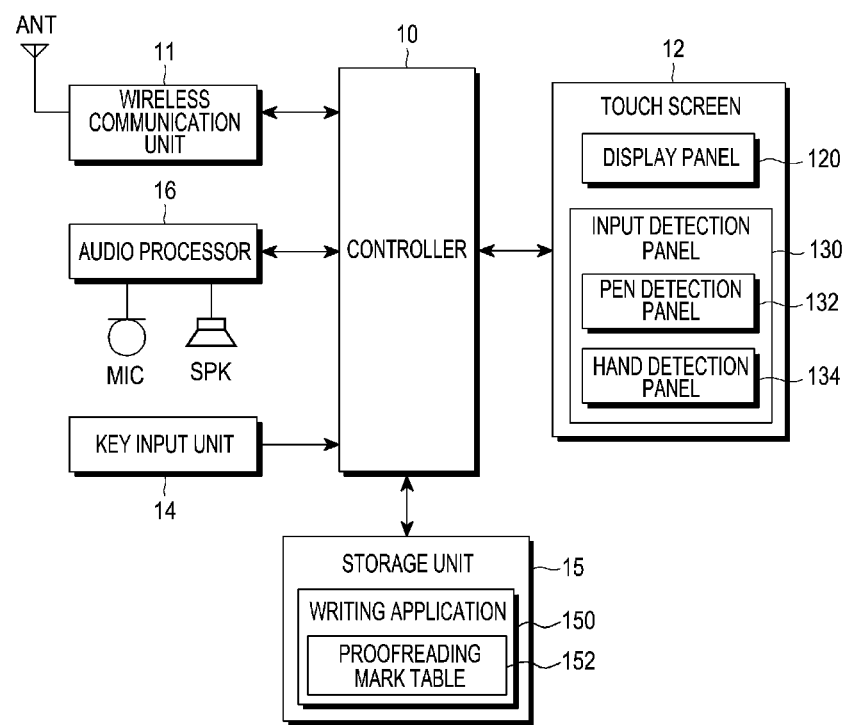
FIG. 2 is a block diagram illustrating a content writing apparatus according to an embodiment of the present disclosure.

FIG. 2 is a block diagram illustrating a content writing apparatus according to an embodiment of the present disclosure.

Referring to FIGS. 1 and 2, a portable terminal 1 may include a controller 10, a wireless communication unit 11, a touch screen 12, a key input unit 14, a storage unit 15, and an audio processor 16.

The touch screen 12 may include a display panel 120 for displaying information output from the portable terminal 1 and an input detection panel 130 for performing various input functions by the user. The display panel 120 may be generally configured by a Liquid Crystal Display (LCD) screen or an Organic Light Emitting Diode (OLED) (e.g., a Passive Matrix OLED (PMOLED) or an Active Matrix OLED (AMOLED)) screen and may be implemented integrally with the input detection panel 130 structurally. The display panel 120 may display various screens according to various operation states of the portable terminal 1, a menu state, an application execution, a service, and the like.

The input detection panel 130 may be implemented by one or more panels which can detect various inputs, such as a user's single or multi touch input, a drag input, a writing input, a drawing input, or the like using a finger or an electronic pen 2 (hereinafter also referred to as a "pen"). For example, the input detection panel 130 may be implemented using one panel which can detect both a finger input and an electronic pen input. Alternatively, the input detection panel 130 may be implemented using two panels including a hand detection panel 134 which can detect the finger input and a pen detection panel 132 which can detect the electronic pen input.

The hand detection panel 134 can detect a touch input of the user. The hand detection panel 134 may be implemented using a touch film, a touch sheet, a touch pad, or the like. The hand detection panel 134 may detect a touch input and output a touch event value corresponding to a detected touch signal. At this time, information corresponding to the detected touch signal may be displayed on the display panel 120. The hand detection panel 134 may receive a control signal by the touch input of the user through various input means. For example, the hand detection panel 134 may detect a touch input including a user's body (e.g., a finger) or a physical tool. More specifically, the hand detection panel 134 may be a capacitive type touch panel. When the hand touch panel 134 is the capacitive type touch panel, the hand detection panel 134 is produced by coating both sides of glass with a thin metal conductive material (e.g., an Indium Tin Oxide (ITO) film) to allow a current to flow on a surface of the glass and thus is coated with a dielectric that can store a charge. When a surface of the hand detection panel 134 is touched by an object, an amount of the charge is moved to a contact position by static electricity, and the hand detection panel 134 recognizes a changed amount of the current according to the movement of the charge to detect the touch position and tracks a touch event. The touch event generated on the hand detection panel 134 may be generated mainly by a finger of a person but may be generated by another object which makes a change in capacitance, for example, a conductive object which makes the change in capacitance.

The pen detection panel 132 detects a proximity input or a contact input of the electronic pen according to the use of the electronic pen 2 (e.g., a stylus pen or a digitizer pen) and outputs a detected electronic pen proximity event or electronic pen contact event. The pen detection panel 132 may be implemented in an Electro-Magnetic Resonance (EMR) type and may detect a touch or a proximity input according to a change in intensity of an electrical magnetic field by the proximity or the touch of the pen. More specifically, the pen detection panel 132 may include an electromagnetic induction coil sensor (not shown) having a grid structure in which a plurality of loop coils are arranged in a first direction and a second direction crossing the first direction and an electronic signal processor (not shown) sequentially providing an alternating current signal having a determined frequency to each of the loop coils of the electromagnetic induction coil sensor. When the electronic pen 2 having a resonance circuit therein exists near the loop coil of the pen detection panel 132, a magnetic field transmitted from the corresponding loop coil generates a current based on mutual electromagnetic induction in the resonance circuit within the electronic pen. Based on the current, the induced magnetic field is generated from the coil included in the resonance circuit within the electronic pen, and the pen detection panel 132 detects the induced magnetic field from the loop coil in a signal reception state to detect a proximity position or a touch position of the pen. Proximity and touch of any object which can generate the current based on the electromagnetic induction can be detected through the pen detection panel 132. The pen detection panel 132 may have an activation state according to generation of a particular event or by default. Further, the pen detection panel 132 may be located in a determined area, for example, an area to cover a display area of the display panel 120 below the display panel 120.

An example of a configuration of the electronic pen 2 in the EMR type will be described below in more detail. In order to generate different signals in a contact state and a hovering state on the touch screen, the electronic pen 2 includes a main resonance circuit generating a basic resonance signal and a contact variable resonance circuit connected with the main resonance circuit to change a resonance frequency of the main resonance circuit. The contact variable resonance circuit may be implemented by a variable inductor component having an inductance value variable according to contact pressure or a variable capacitor component having a capacitance value variable according to contact pressure when a tip of the electronic pen 2 contacts the touch screen.

By the contact variable resonance circuit, the resonance frequency generated by the main resonance circuit is different according to the contact or hovering state of the electronic pen 2 on the touch screen 12. The pen detection panel 132 may detect the difference of the resonance frequency to distinguish between the contact state and the hovering state of the electronic pen 2 on the touch screen 12.

Further, the electronic pen 2 may separately include a control button (not shown) prepared for a user input control and located at an outer surface, and may further include a button input variable resonance circuit for additionally changing the resonance frequency of the main resonance circuit according to an input state of the control button. The button input variable resonance circuit may be implemented by the variable inductor component or the capacitor component changed according to the button input.

By the button input variable resonance circuit, the pen detection panel 132 (or separate sensor) may detect the input state of the control button of the electronic pen 2 and perform an additional operation according to the input of the control button. At this time, the input state of the control button may be differently detected in the contact state and the hovering state of the electronic pen 2 on the touch screen 12.

The wireless communication unit 11 may be included in the portable terminal 1 when the portable terminal 1 supports a wireless communication function. For example, when the portable terminal 1 supports a mobile communication function, the wireless communication unit 11 may be configured by a mobile communication module. More specifically, in order to perform an operation for transmitting/receiving and processing a wireless signal for the mobile communication function, the wireless communication unit 11 may include an antenna, a Radio Frequency (RF) unit, and a MOdulator/DEModulator (MODEM). The RF unit includes an RF transmitter for up-converting and amplifying a frequency of a transmitted signal and an RF receiver for low-noise amplifying and down-converting a received signal. The MODEM includes a transmitter for coding and modulating a signal to be transmitted and a receiver for decoding and demodulating a signal received by the RF unit. The wireless communication unit 11 may perform particular functions of the portable terminal 1 requiring a communication function, for example, a chatting function, a message transmission/reception function, a call function, and the like.

The key input unit 14 includes a key for controlling a plurality of operations mechanically included in an outer housing of the corresponding portable terminal 1 to receive a control by the user. The key may be configured by a side key or a separately prepared touch pad. Further, the key input unit 14 may include a button key for turning on or off the portable terminal 1, a home key for returning to a basic screen supported by the portable terminal 1, and the like.

The audio processor 130 may include at least one of a speaker for outputting an audio signal of the portable terminal 1 and a microphone for collecting the audio signal. The audio processor 130 includes the speaker, the microphone, and a voice codec for processing audio signals input/output through the speaker and the microphone. In performing a phone call according to the mobile communication function, the audio processor 130 receives a voice of the user or outputs an audible sound for the user and further outputs processing sounds corresponding to various operations or sounds corresponding to various digital audio contents, video contents, and the like.

The storage unit 15 is a component for storing various programs and data required for operating the portable terminal 1. For example, the storage unit 15 may include various application programs and related contents, and program memories and data memories for storing data related to operation processing. The program memory stores a program for controlling general operations of the portable terminal. The storage unit 15 further stores a writing application 150 corresponding to an operation program for writing content through a writing input on the touch screen according to a characteristic of the present disclosure. The writing application 150 pre-stores a proofreading mark table 152 used for editing a written content described below.

The controller 10 may control general operations of the portable terminal 1 by collectively controlling the respective function units, and switch and control the operations of the portable terminal 1 according to a user input made through the touch screen 12 or the key input unit 14. Further, according to a characteristic of the present disclosure, the controller 10 controls various related operations for receiving and displaying a writing image by using the electronic pen 2. For example, the controller 10 identifies a proofreading mark in a written input content to edit the content based on the writing input and control an operation of proofreading the written content by applying an editing content for the corresponding proofreading mark according to the characteristic of the present disclosure. An operation of the controller 10 according to an embodiment of the present disclosure will be described below.

Figure 3:
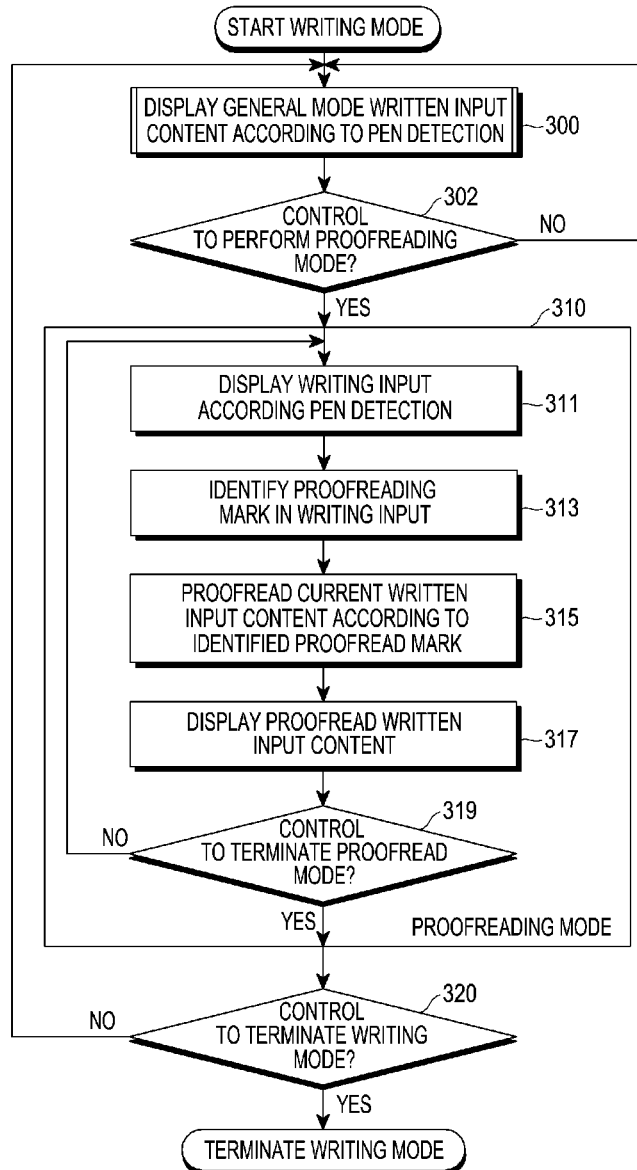
FIG. 3 is a flowchart illustrating a content writing operation through a writing input on a touch screen according to an embodiment of the present disclosure.

FIG. 3 is a flowchart illustrating a content writing operation through a writing input on a touch screen according to an embodiment of the present disclosure. In implementation, the content writing operation may be performed under a control of the controller 10 illustrated in FIG. 2.

Referring to FIG. 3, when a writing mode operation starts by identifying an input of a menu selection item to write content through a writing input, an operation of displaying written input content in a general mode according to a pen detection is performed in operation 300. That is, the operation in the general mode generates a proper writing image according to a trace of a pen detection position based on the pen detection and displays the writing image on the screen. Of course, in this event, a thickness and color of each stroke in the writing image may be controlled by a separate menu environment.

When there is a selection for performing a proofreading mode operation according to a characteristic of the present disclosure while the operation of displaying the written input content in the general mode in operation 300 is performed, the selection is identified in operation 302 and operation 310 is performed. The selection for performing the proofreading mode operation may be, for example, selection of a "proofreading mode" menu item from a menu bar properly set on an upper part of the screen for the writing input to enter the proofreading mode according to an embodiment of the present disclosure. The menu bar may include the proofreading mode menu item installed according to a characteristic of the present disclosure and a plurality of listed menu items for setting various writing environments.

Alternatively, the selection for performing the proofreading mode operation may be determined as an input of the control button of the electronic pen 2 in operation 302. That is, when the control button of the electronic pen 2 is input during the writing mode, it is determined to enter the proofreading mode. According to still another embodiment of the present disclosure, the selection for performing the proofreading mode operation may be determined as a continuous input state of the control button of the electronic pen 2. That is, when the writing input is made in a state where the input of the control button of the electronic pen 2 is maintained during the writing mode, the corresponding writing input may be considered as a proofreading mark. Operations according to other various embodiments of the present disclosure may be performed in parallel with the operations according to an embodiment of the present disclosure.

Operation 310 corresponds to the proofreading mode operation of performing the proofreading operation based on the writing according to a characteristic of the present disclosure in which the written content is proofread by identifying a proofreading mark (or proofreading marks) in the written input content and applying an editing content for the corresponding proofreading mark. The proofreading mode operation of operation 310 may be divided into operations 311 to 319. The writing input according to the pen detection is displayed in operation 311, and it is identified whether there is a matching proofreading mark among proofreading marks in the writing input in operation 313. In this event, the written content other than the identified proofreading mark may be identified by an added or changed content. Alternatively, according to another embodiment of the present disclosure, when there is no matching proofreading mark in operation 313, the corresponding written content is deleted and the process is returned to operation 311 to repeatedly perform the above processes to re-perform the operation of inputting, displaying, and identifying the proofreading mark.

A proofreading function is identified according to the identified proofreading mark and a current written input content is proofread in operation 315, and the proofread written input content is displayed in operation 317.

In operation 319, it is identified whether there is a proofreading mode termination control. When there is no proofreading mode termination control, the process is returned to operation 311 to repeatedly perform the proofreading mode operation. When there is the proofreading mode termination control, the proofreading mode operation is terminated and operation 320 is performed. At this time, the proofreading mode termination control may be a re-input of the proofreading mode menu item of the menu bar in an embodiment of the present disclosure. That is, controls of an entry into the proofreading mode and a release of the proofreading mode may be performed through the input and the re-input of the proofreading mode menu item.

Alternatively, according to another embodiment of the present disclosure, the proofreading mode termination control in operation 319 may be a re-input of the control button of the electronic pen 2. That is, when the control button of the electronic pen 2 is input in the proofreading mode, it is considered as the proofreading mode termination control and the mode enters the writing mode again.

According to another embodiment of the present disclosure, the proofreading mode termination control may be a release of the input state of the control button of the electronic pen 2, that is, a non-input of the control button. For example, when the input of the control button of the electronic pen 2 is released without being maintained in the proofreading mode, the mode may immediately enter the writing mode again. In such an operation, when the user desires to input the proofreading mark in the writing mode, it is noted that the user inputs the proofreading mark in a state where the control button is pressed.

As described above, when the proofreading mode operation of operation 310 is terminated, it is identified whether there is a writing mode termination control in operation 320. When there is no writing mode termination control, the process is returned to operation 300 to repeatedly perform the above processes. When there is the writing mode termination control, the writing mode is terminated. The writing mode termination control may be an input of a menu selection item to terminate the content writing operation through the writing input or may be an input for performing an interworking with another application, such as storing a written content, transmitting a message or the like.

Figures 4A, 4B:
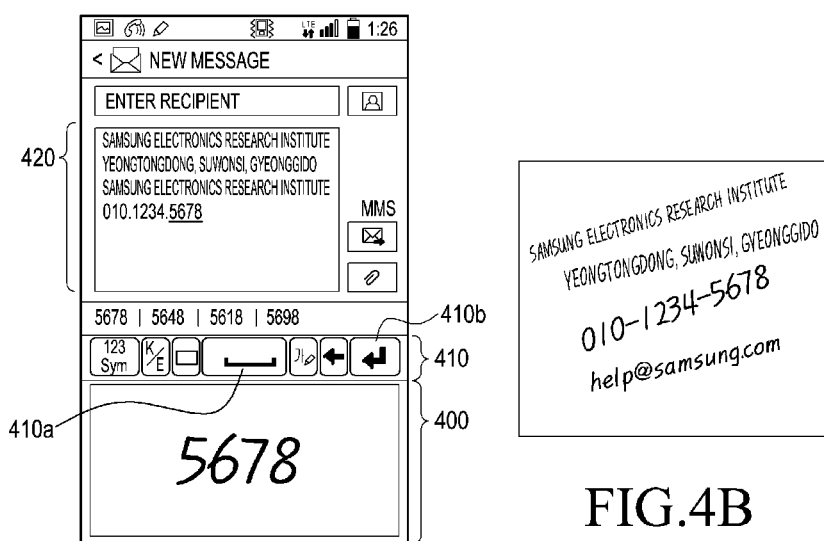
FIGS. 4A and 4B illustrate a comparison between a writing input screen of a touch screen according to an embodiment of the present disclosure and a writing input screen according to the related art.

FIGS. 4A and 4B illustrate a comparison between a writing input screen of a touch screen according to an embodiment of the present disclosure and a writing input screen according to the related art. For example, FIG. 4A illustrates an example of a writing input screen of the related art when a message is written and FIG. 4B illustrates an example of a writing input screen according to an embodiment of the present disclosure.

Referring to FIG. 4A, when a writing input is made in a writing input area 400 of an entire screen, the writing input is recognized as a character and the recognized character is displayed on a message display area 420. At this time, a menu bar 410 including a plurality of menu items is located at an upper part of the writing input area 400, and the menu items may include an "insert space" menu item 410a and a "begin a new line" menu item 410b to perform the proofreading operation of the input content. When the user selects the menu item to perform the proofreading operation in the writing input, an input position of a next character of the recognized characters is changed in the message display area 420.

As described above, the scheme illustrated in FIG. 4A has difficulty in applying various proofreading items and the user feels inconvenienced when using the applied proofreading items. As illustrated in FIG. 4B, an embodiment of the present disclosure provides a method by which the user can simply perform the proofreading operation while freely making the writing input (of a relatively large amount corresponding to a plurality of rows).

Figures 5A, 5B, 5C:
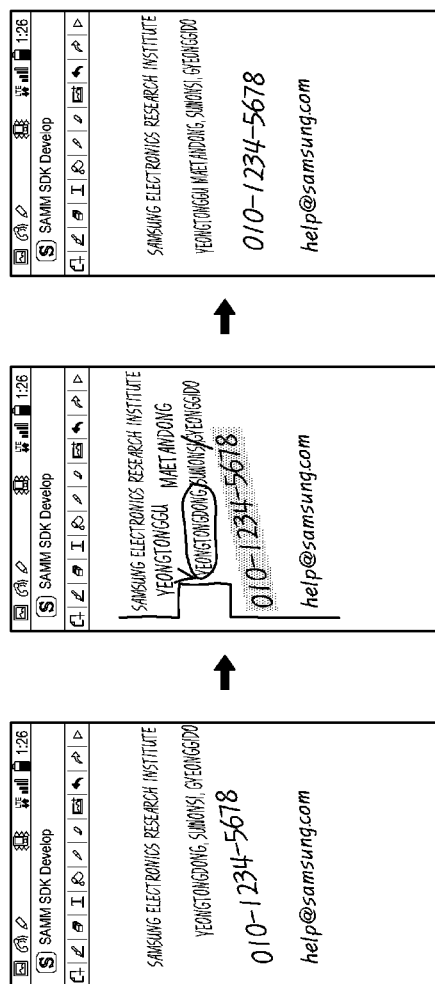
FIGS. 5A, 5B, and 5C illustrate screens for editing written content when the content is written through a writing input on a touch screen according to an embodiment of the present disclosure.

FIGS. 5A, 5B, and 5C illustrate screens for editing written content when the content is made through a writing input on a touch screen according to an embodiment of the present disclosure.

Referring to FIG. 5A, a screen is illustrated in a state where the same writing input as that illustrated in FIG. 4B is made, FIG. 5B illustrates a screen in a state where a proofreading mark and an added or changed content are input into the corresponding written content according to the characteristic of the present disclosure, and FIG. 5C illustrates a screen displaying the written content in a state where the proofreading has been completed. As illustrated in FIGS. 5A to 5C, it is noted that the proofreading mark is freely written in the writing input screen of the touch screen like in the content input scheme and the written content is proofread according to the written proofreading mark in the present disclosure. At this time, although FIG. 5B) illustrates as if a proofreading operation is performed after a plurality of proofreading marks and the content to be proofread are all input, (such an operation is possible but) the proofreading operation according to one proofreading mark input is sequentially performed. Hereinafter, a proofreading operation according to each proofreading mark will be described in more detail.

Figure 6A:
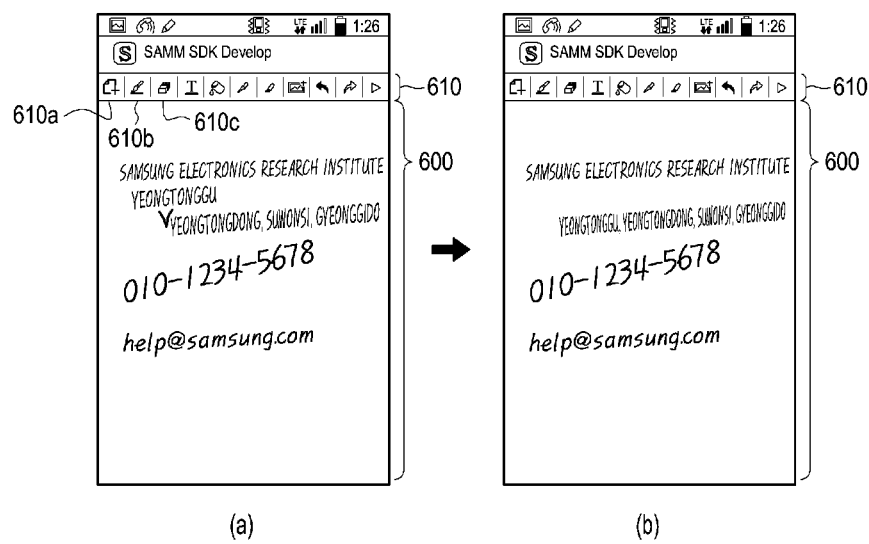
FIGS. 6A, 6B, and 7 illustrate screens for "insertion proofreading" in the writing editing of FIG. 5 according to an embodiment of the present disclosure.
Figure 6B:
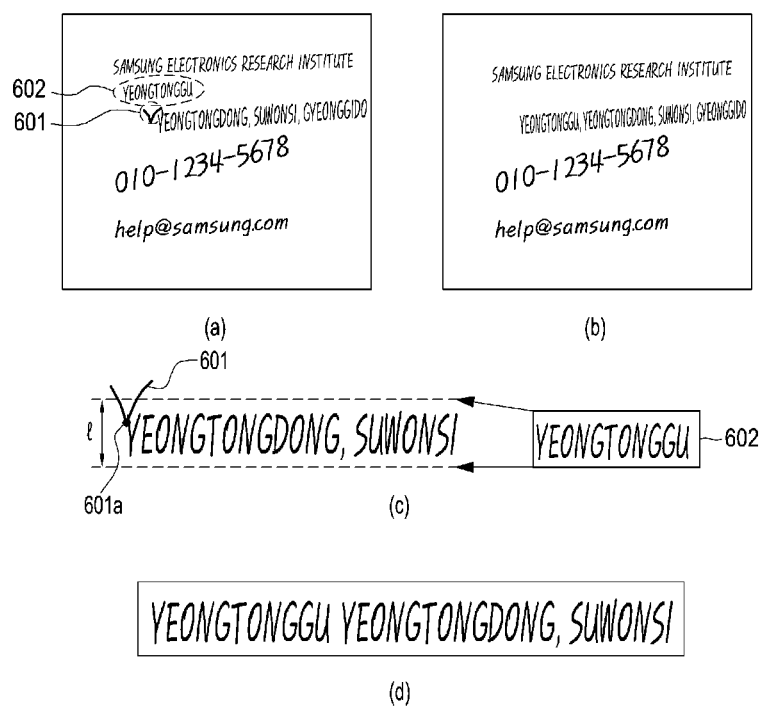
Figure 7:
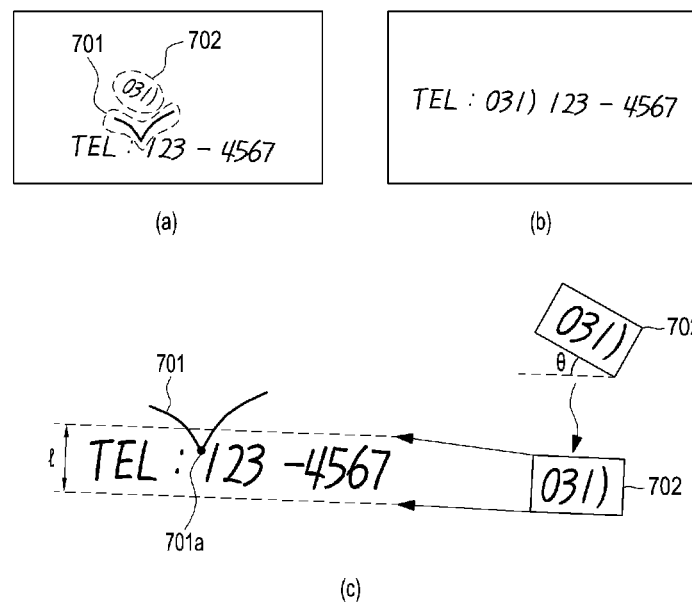

FIGS. 6A, 6B and 7 illustrate screens for "insertion proofreading" in the writing editing of FIG. 5 according to an embodiment of the present disclosure.

Referring to FIG. 6A, screen (a) illustrates a state where a proofreading mark for the "insertion proofreading" and content to be proofread are input into the input written content, and screen (b) illustrates a displaying of content in which the proofreading according to the corresponding insertion proofreading mark has been completed. Screens (a) and (b) of FIG. 6B illustrate writing input screen areas of screens (a) and (b) of FIG. 6A, respectively, and screens (c) and (d) of FIG. 6B illustrate expanded images of the written content to be proofread and the proofread written content of screens (a) and (b) of FIG. 6B, respectively.

Referring to FIG. 6A, an entire screen includes a writing input screen area 600 and a menu bar 610 including a plurality of menu items on an upper part of the writing input screen area 600. The menu items include a menu item 610a for controlling the entry/release into/from the proofreading mode according to a characteristic of the present disclosure, a menu item 610b for selecting a particular pen from plural types of pens having different writing features, and an eraser menu item 610c for erasing the writing input, and may further include a menu item for returning the writing input to a previous state, a menu item for restoring the state returned to the previous writing input state, and an image file insertion menu item.

According to various embodiments of the present disclosure, the entry/release into/from the proofreading mode may be performed by identifying an input or an input maintenance state of the control button of the electronic pen 2. In this event, the menu item 610a for controlling the entry/release into/from the proofreading mode may not be provided. Alternatively, in this event also, the menu item 610a for controlling the entry/release into/from the proofreading mode may be provided to help the control by the user.

Referring to FIGS. 6A and 6B, the proofreading mark may be recognized by N strokes input by the user in the proofreading mode according to an embodiment of the present disclosure. N refers to a number of gesture strokes defining the proofreading mark. N may be set as "1" and a first stroke first input in the proofreading mode may be recognized as the proofreading mark. That is, in this event, all proofreading marks may be formed with only one stroke. As described above, since the first stroke is considered as the proofreading mark, it is identified which proofreading mark is input by comparing a shape of the first input stroke and shapes corresponding to a plurality of proofreading marks. Of course, through a character recognition, the shape of the proofreading mark can be recognized regardless of a sequence of the stroke inputs.

In the example of FIGS. 6A and 6B, the proofreading mark having a shape of "v" is set as an "insertion" proofreading mark 601. When the insertion proofreading mark 601 is recognized, an inflection point 601a of the insertion proofreading mark 601 is identified to determine a position where an additional content 602 as indicated by "Yeongtonggu" will be inserted in FIGS. 6A and 6B. Thereafter, written input characters from an N+1th stroke are considered as the additional content 602 to be inserted and the additional content 602 is inserted into the insertion position. Of course, in this event, the existing written content (e.g., content at a right side, for example, "Yeongtongdong" in FIGS. 6A and 6B) located at the insertion position will be moved (e.g., to a right side) not to overlap the additional content 602 to be inserted.

At this time, sizes of the existing written characters may be different from sizes of characters to be inserted. Accordingly, the insertion into the insertion position is made after extracting a reference height (l) and a reference line of characters around the insertion position and then enlarging/reducing the additional content 602 to be inserted with the same ratio based on the reference height (l) and the reference line. In the example of FIGS. 6A and 6B, the insertion is made after enlarging "Yeongtonggu" to match heights of neighboring characters. At this time, an operation for reducing a width or an interval between the characters may be performed.

Meanwhile, since the characters around the insertion position may have their own slopes, the insertion may be performed by making slopes of the input characters have the same angle as that of the reference line.

FIG. 7 illustrates screens in which the insertion is made by matching the written content to be inserted with the slope of the reference line of neighboring characters. Screens (a) and (b) of FIG. 7 illustrate writing input screen areas in which the proofreading mark and the content to be proofread have been completely input and the proofreading has been completed, respectively.

As illustrated in FIG. 7, when an insertion proofreading mark 701 having a "v" shape is recognized, an inflection point 701a of the insertion proofreading mark 701 is identified and an addition content 702 as indicated by "031)" is inserted as illustrated in screen (c). At this time, the insertion into the insertion position is made after extracting a reference height (1) and a reference line of characters around the insertion position and then enlarging/reducing the additional content 702 to be inserted with the same ratio based on the reference height (1) and the reference line. Further, the insertion is made after making slopes of the input characters have the same angle as that of the reference line since the characters around the insertion position may have their own slopes.

Figure 8A:
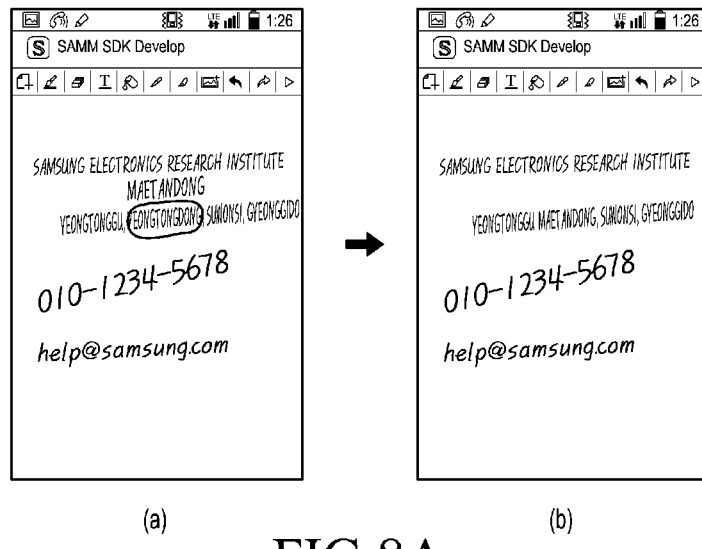
FIGS. 8A and 8B illustrate screens for "replacement (deletion and insertion) proofreading" in the writing editing of FIG. 5 according to an embodiment of the present disclosure.
Figure 8B:
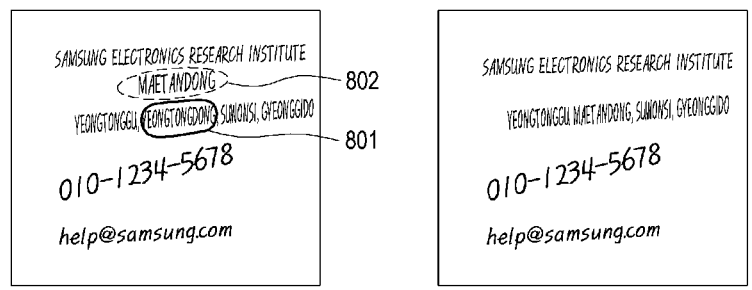
Figure 8B:
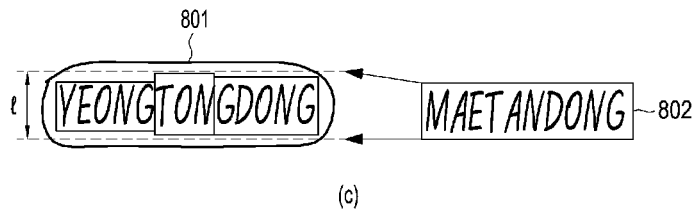

FIGS. 8A and 8B illustrate screens for "replacement (deletion and insertion) proofreading" in the writing editing of FIG. 5 according to an embodiment of the present disclosure. In more detail, screen (a) of FIG. 8A illustrates an example of a state where a proofreading mark for the "replacement proofreading" and content to be proofread are input into the input written content, and screen (b) of FIG. 8A illustrates an example of displaying written content in which the proofreading according to the corresponding proofreading mark has been completed. Screens (a) and (b) of FIG. 8B illustrate writing input screen areas of screens (a) and (b) of FIG. 8A, respectively, and screen (c) of FIG. 8B illustrates an expanded image of the written content to be proofread and the proofread written content.

Referring to FIGS. 8A and 8B, a proofreading mark having a circle shape ("o") may be a "replacement" proofreading mark 801. When the replacement proofreading mark 801 is recognized, an area occupied by the replacement proofreading mark 801 is identified and the written content indicated by "Yeongtongdong" within the occupied area is replaced with a replacement content 802 as indicated by "Maetandong"

Similar to the insertion proofreading scheme, the insertion into the insertion position is made after extracting a reference height (1) and a reference line of the replaced characters and enlarging/reducing the replacement content 802 with the same ratio based on the reference height (1) and the reference line.

Figure 9A:
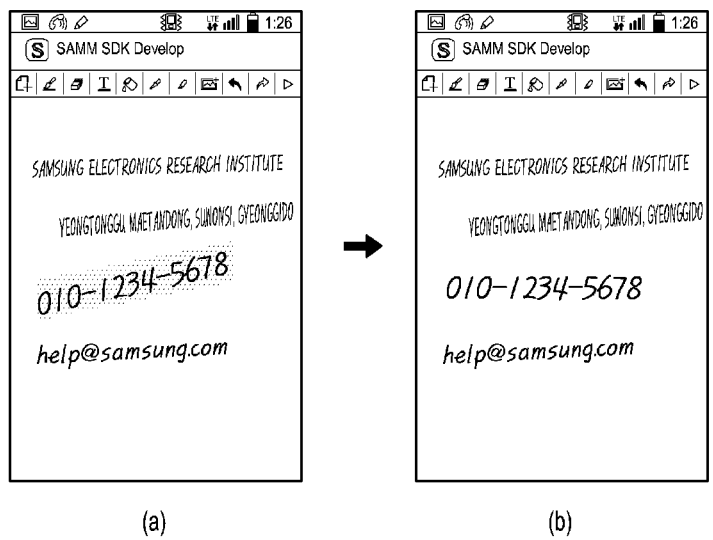
FIGS. 9A, 9B, 10A, and 10B illustrate screens for "slope proofreading" in the writing editing of FIG. 5 according to an embodiment of the present disclosure.
Figure 9B:
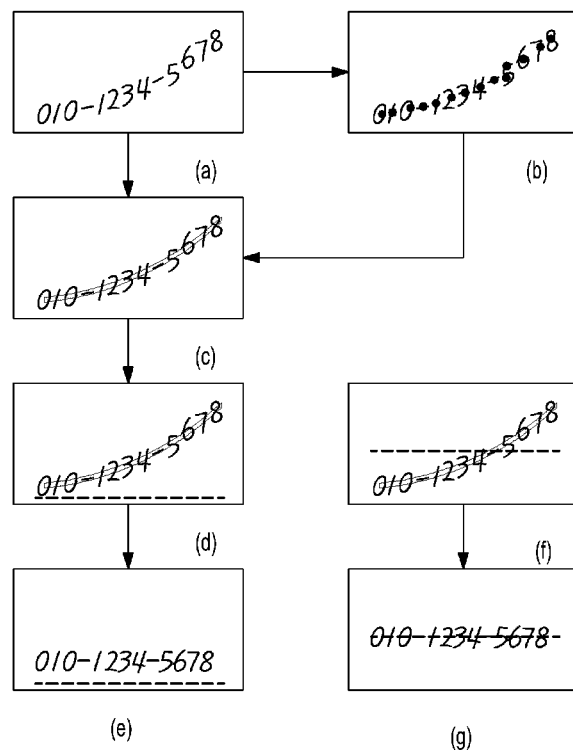

FIGS. 9A and 9B illustrate screens for "slope proofreading" in the writing editing of FIG. 5 according to an embodiment of the present disclosure. In the "slope proofreading", a slope of a part corresponding to a character string including a plurality of characters is proofread in the written content. At this time, FIGS. 9A and 9B illustrate an example of a screen in which the slope proofreading is made, and particularly, a slope is proofread through a "horizontal alignment" scheme making slopes of characters become "0".

Referring to FIG. 9A, screen (a) illustrates an example of a state where a proofreading mark for the "slope proofreading" is input, and screen (b) illustrates an example of displaying a written content in which the proofreading according to the corresponding proofreading mark has been completed. Screens (a) to (g) of FIG. 9B illustrate examples of conversion steps of the slope proofreading.

Referring to FIGS. 9A and 9B, when the proofreading mark is identified in the written content, it is identified whether there is a form connecting the character string including a plurality of characters by one line, and the form is recognized as a slope proofreading mark. At this time, the characters are moved and rotated in such a manner that slopes of the characters become 0 degrees based on a stroke of the corresponding proofreading mark as a guideline.

At this time, an approximate curve is extracted using centers of gravity of the characters corresponding to the guideline. The center of gravity of the characters corresponds to an average value of pixel values corresponding to strokes of the corresponding characters.

A method of moving and rotating the characters may be performed by calculating a slope of a tangent line of the approximate curve corresponding to an x coordinate at a center of each character as an angle. When it is assumed that the approximate curve is a combination of coordinates of several strokes, the slope angle may be calculated from points adjacent to the stroke coordinate corresponding to the x coordinate at the center of the character.

In FIG. 9B, screen (a) illustrates the character string to be slope-proofread, screen (b) illustrates centers of gravity of respective characters included in the character string, and screen (c) illustrates an approximate curve by the centers of gravity. Screen (d) of FIG. 9B illustrates a reference line having a slope of "0" as indicated by a dotted line and screen (e) illustrates a final state in which the respective characters are moved and rotated based on the reference line.

In addition, screens (d) and (e) illustrate an example of the reference line located under the character string, but the reference line may be located at a center of the charter string as illustrated in screens (f) and (g).

The approximate curve, the centers of gravity, and the reference line of FIG. 9B are illustrated for convenience of the description, and it is understood that the approximate curve, the centers of gravity, and the reference line are not shown on the actual screen.

Figure 10A:
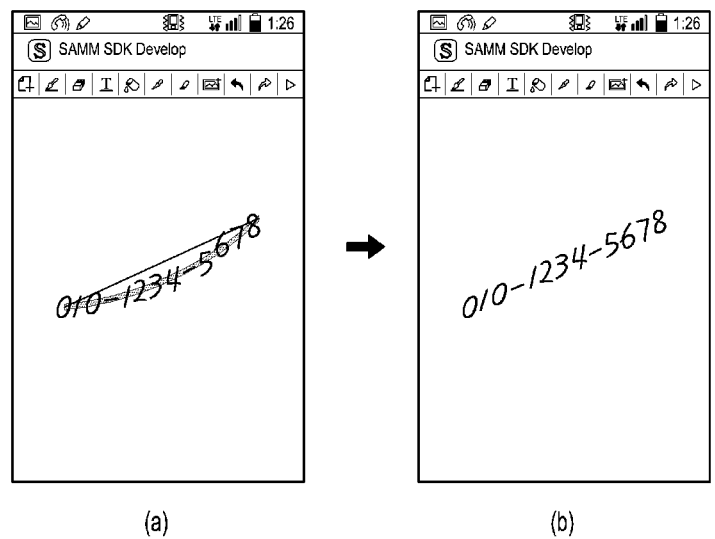
Figure 10B:
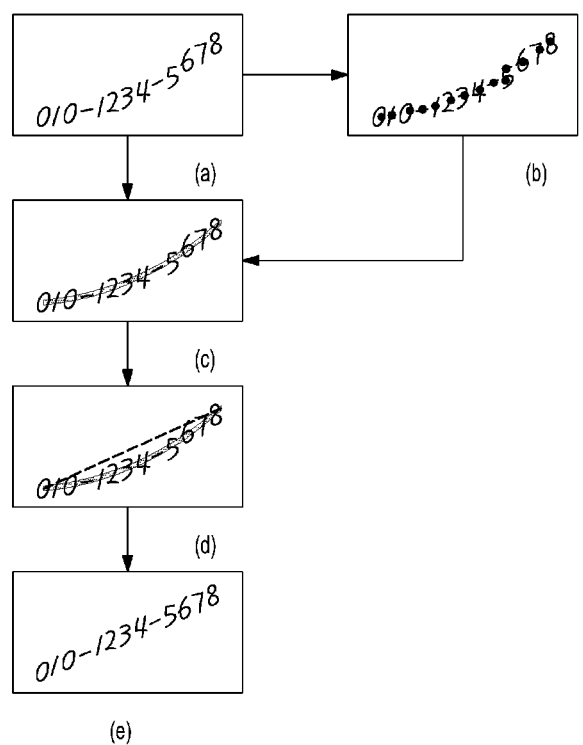

FIGS. 10A and 10B illustrate screens for "slope proofreading" in the writing editing of FIG. 5 according to an embodiment of the present disclosure. In FIGS. 10A and 10B, the slope is proofread through an "approximate slope alignment" scheme making the slope of the character string become an average approximate slope.

Screen (a) of FIG. 10A illustrates an example of a state where a proofreading mark for the "slope proofreading" is input into the written content, and screen (b) illustrates an example of displaying the written content in which the proofreading according to the corresponding proofreading mark has been completed. Screens (a) to (e) of FIG. 10B illustrate examples of detailed conversion steps of the slope proofreading.

Referring to FIGS. 10A and 10B, when the proofreading mark is identified in the written content, it is determined whether there is one line connecting the character string including a plurality of characters, and the one line is recognized as a slope proofreading mark. At this time, the characters are moved and rotated in such a manner that slopes of the characters match the approximate slope of the guideline which is the stroke of the proofreading mark.

At this time, an approximate curve is extracted using centers of gravity of the characters corresponding to the guideline and an approximate straight line is extracted based on end points of the approximate curve. Thereafter, the movement and the rotation is made by calculating a slope of a tangent line of the approximate curve corresponding to an x coordinate at a center of the character as an angle. The movement is made by positions of the corresponding approximate curve and approximate straight line based on the x coordinate at the center of the character unlike the slope proofreading scheme illustrated in FIGS. 9A and 9B.

Screen (a) of FIG. 10B illustrates the character string to be slope-proofread, screen (b) illustrates centers of gravity of respective characters included in the character string, and screen (c) illustrates an approximate curve by the centers of gravity. Screen (d) of FIG. 10B illustrates an extracted approximate straight line as indicated by a dotted line and screen (e) illustrates a final state in which the respective characters are moved and rotated based on a slope of the approximate straight line.

The approximate curve, the centers of gravity, and approximate straight line of FIG. 10B are illustrated for convenience of the description, and it is understood that the approximate curve, the centers of gravity, and the approximate straight line are not shown on the actual screen.

Figure 11A:
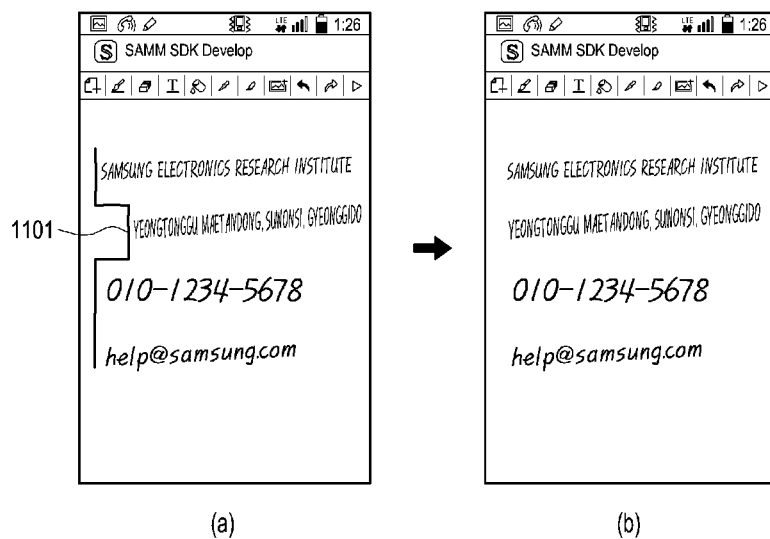
FIGS. 11A and 11B illustrate screens for "paragraph alignment proofreading in the writing editing of FIG. 5 according to an embodiment of the present disclosure.
Figure 11B:
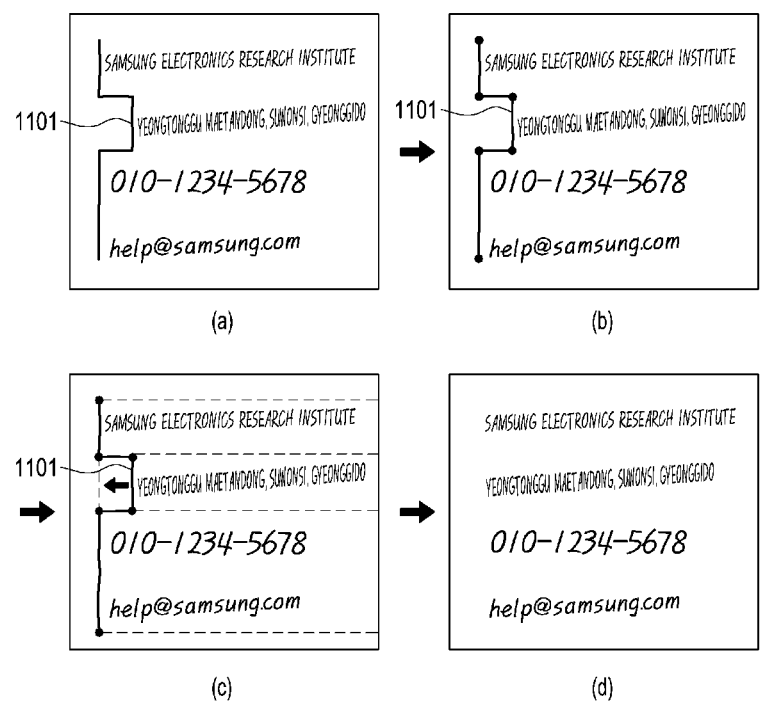

FIGS. 11A and 11B illustrate screens for "paragraph alignment proofreading" in the writing editing of FIG. 5 according to an embodiment of the present disclosure. More particularly, FIGS. 11A and 11B illustrate examples of screens in a state where a paragraph is aligned through a "reverse indentation" scheme among the paragraph alignment proofreading. Screen (a) of FIG. 11A illustrates an example of a state where a proofreading mark for the "paragraph alignment proofreading" is input into the input written content, and screen (b) illustrates an example of displaying the written content in which the proofreading according to the corresponding proofreading mark has been completed. Screens (a) to (d) of FIG. 11B illustrate examples of conversion steps of the paragraph alignment proofreading.

Referring to FIGS. 11A and 11B, when the proofreading mark is identified in the written content, a form of a paragraph alignment is identified and the form is recognized as a paragraph alignment proofreading mark 1101. The corresponding paragraph (row) is identified and a position thereof is aligned. More specifically, inflection points are extracted from a stroke of the proofreading mark 1101, a paragraph (row) to be aligned is detected based on horizontal positions (x) of the inflection points, and each of the horizontal positions is adjusted for each of the paragraphs.

Screen (a) of FIG. 11B illustrates a state where the paragraph alignment proofreading mark 1101 is identified, screen (b) illustrates a state where inflection points are extracted from the paragraph alignment proofreading mark 1101, screen (c) illustrates a state where an area corresponding to a paragraph (row) to be aligned according to the extracted inflection points is extracted, and screen (d) illustrates a final state where a position of the corresponding area is proofread.

As illustrated in FIGS. 6A to 11B, the operations for inputting the proofreading marks and the proofreading operations according to the input operations may be performed.

Figure 12:
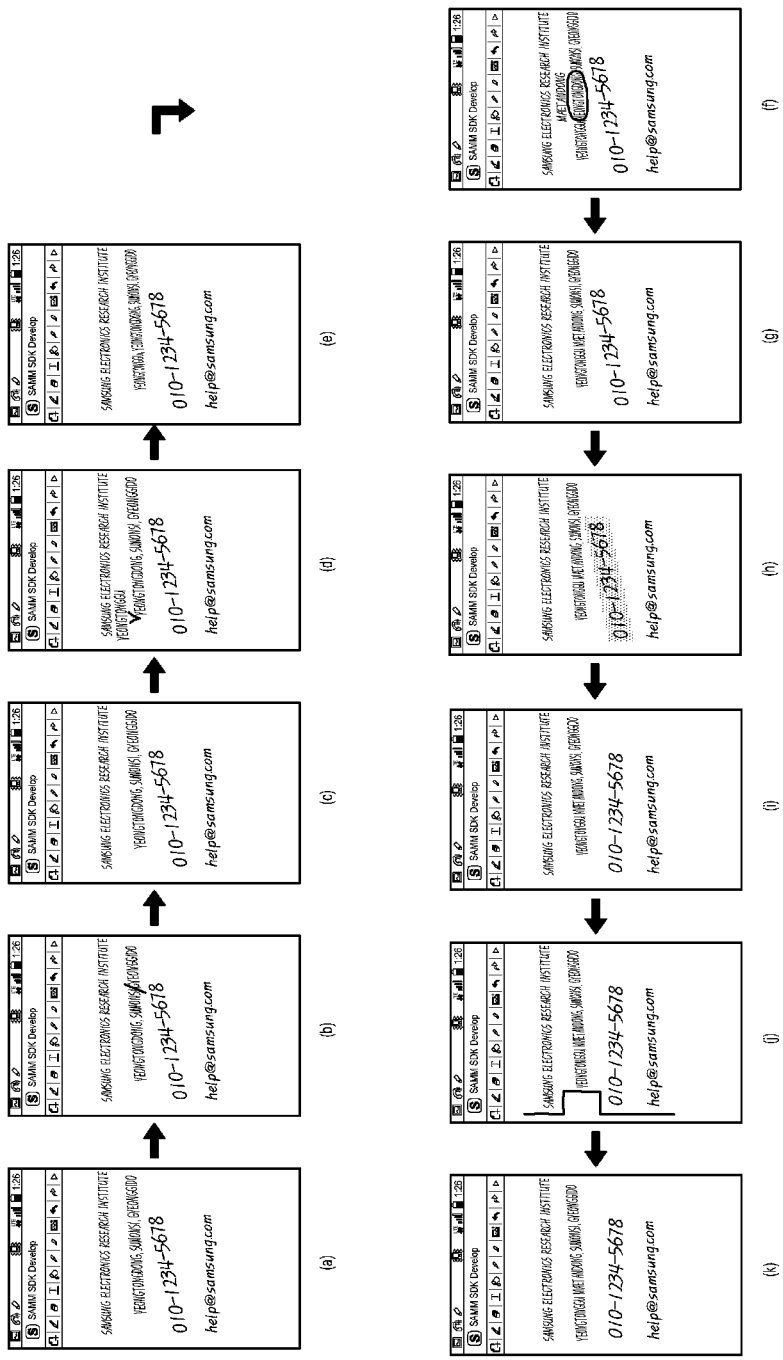
FIG. 12 illustrates screens for editing the written content of FIG. 5 according to an embodiment of the present disclosure.

FIG. 12 illustrates screens for editing the written content of FIG. 5 according to an embodiment of the present disclosure.

Referring to FIG. 12, screens (a) to (k) illustrate screens corresponding to respective steps when a plurality of proofreading marks are input and respective steps are sequentially performed according to the proofreading operations.

As described above, an operation for writing content through a writing input may be performed on a touch screen according to an embodiment of the present disclosure. Meanwhile, although the present disclosure has described a certain embodiment, various modifications may be made without departing from the scope of the present disclosure.

Figure 13:
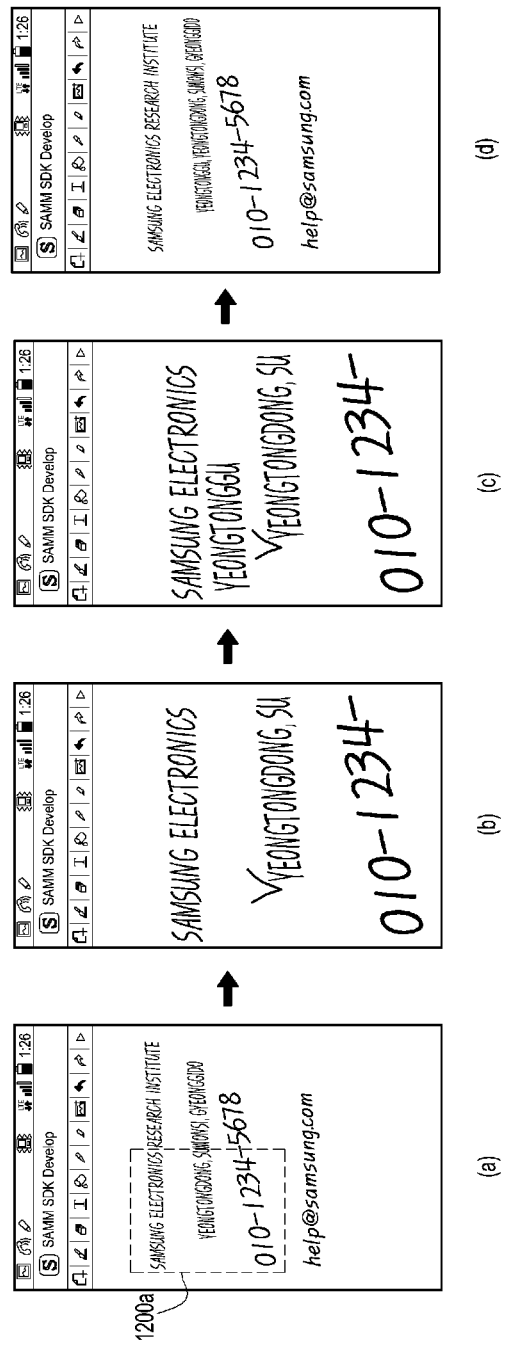
FIG. 13 illustrates screens where a proofreading area expanding operation is performed in the writing editing of FIG. 5 according to an embodiment of the present disclosure.

For example, when the proofreading mark is detected in the operation of the proofreading mode as described above, an area around the detected proofreading mark is set as a proofreading area 1200a and the corresponding area is displayed while being expanded as illustrated in FIG. 13. As a result, the user can more easily perform the proofreading operation.

FIG. 13 illustrates screens where a proofreading area expanding operation is performed in the writing editing of FIG. 5 according to an embodiment of the present disclosure.

Referring to FIG. 13, screen (a) illustrates an example where the proofreading area 1200a is set in a state where a proofreading mark is input in the proofreading mode, screen (b) illustrates an example where the corresponding proofreading area 1200a is expanded and output as an entire writing input area, screen (c) illustrates an example where an addition written content to be proofread is input into the corresponding expanded proofreading area, and screen (d) illustrates an example where the proofreading operation is completed and a size of the screen is returned to an original state.

Although the proofreading marks and the proofreading functions related to the proofreading marks have been described based on the "insertion proofreading", the "replacement proofreading", the "slope proofreading", the "paragraph alignment proofreading", and the like as examples, various proofreading marks other than the above listed proofreading marks and proofreading functions related to the various proofreading marks may be diversely set as necessary.

FIG. 14 illustrates a table recording proofreading mark information when content is written through a writing input on a touch screen according to an embodiment of the present disclosure.

Referring to FIG. 14, a table recording proofreading mark information may include various proofreading marks, for example, "take out space", "insert space", begin a new line", and the like as the proofreading marks and the proofreading functions related to the proofreading marks.

Further, although it has been described that a writing input and a proofreading operation according to the present disclosure are performed when the input on the touch screen is made using the electronic pen, currently a writing input operation using a finger may be performed and the present disclosure can be applied to the writing input operation using the finger.

In addition, although it has been described that a proofreading operation according to the present disclosure is performed in a state where the writing input is made in the writing input mode, a proofreading operation based on the writing according to the present disclosure can be performed in a state where a character-recognized text, a text input according to a keyboard input scheme, or a corresponding document of various documents is displayed on the screen.

It will be appreciated that the various embodiments of the present disclosure can be implemented in a form of hardware, software, or a combination of hardware and software. Any such software may be stored, for example, in a volatile or non-volatile storage device such as a Read-Only Memory (ROM), a memory such as a Random-Access Memory (RAM), a memory chip, a memory device, or a memory IC, or a recordable optical or magnetic medium such as a Compact Disk (CD), a Digital Versatile Disc (DVD), a magnetic disk, or a magnetic tape, regardless of its ability to be erased or its ability to be re-recorded. It will be appreciated that a memory, which may be incorporated in a portable terminal, may be an example of a machine-readable storage medium which is suitable for storing a program or programs including commands to implement the various embodiments of the present disclosure. Accordingly, the present disclosure includes a program that includes a code for implementing an apparatus or a method defined in any claim in the present specification and a machine-readable storage medium that stores such a program. Moreover, such a program may be electronically transferred through an arbitrary medium such as a communication signal transferred through a wired or wireless connection, and the present disclosure properly includes the equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of writing content through a writing input on a touch screen, the method comprising:
   displaying written input content according to a writing input detection and identifying whether there is a proofreading mode control; and
   when there is the proofreading mode control:
      entering a proofreading mode,
      displaying the written input content according to the writing input detection,
      identifying a proofreading mark in the written input content, and
      applying an edit corresponding to the proofreading mark, so as to proofread the written content,
      wherein a type of edit applied is based on the proofreading mark,
      wherein the applying of the edit based on the proofreading mark includes removing the proofreading mark after the edit is applied while maintaining the edit,
      wherein the proofreading mark includes at least one of an "insertion proofreading mark" indicating a content insertion, a "replacement proofreading mark" indicating a content replacement, a "slope proofreading mark" indicating proofreading of a slope of a part corresponding to a character string including a plurality of characters in the written content, and a "paragraph alignment proofreading mark" indicating a paragraph alignment, and
      wherein, in a proofreading operation according to the slope proofreading mark, a form connecting the character string including the plurality of characters in the written content by one line is recognized as the slope proofreading mark and the characters are moved and rotated in a direction making slopes of the characters become 0 based on a stroke of the recognized slope proofreading mark as a guideline.

2. The method of claim 1, wherein the entering of the proofreading mode comprises:
   displaying the written input content according to the writing input detection;
   determining whether there is a matching proofreading mark in the written input; and
   when it is determined that there is a matching proofreading mark in the written script,
      proofreading a current written input content according to a proofreading function corresponding to the matching proofreading mark and the written content to be proofread, and
      displaying the proofread written input content.

3. The method of claim 2, wherein the determining of whether there is the matching proofreading mark comprises identifying N strokes as the proofreading mark when entering a proofreading mode.

4. The method of claim 3, wherein N is 1.

5. The method of claim 2, wherein, when it is determined that there is a matching proofreading mark in the written input, an area around the matching proofreading mark is set as a proofreading area and the proofreading area is displayed while being expanded.

6. The method of claim 2, wherein the proofreading mode control corresponds to selection of a menu item from a menu bar on a screen for a writing input to enter the proofreading mode.

7. The method of claim 2, wherein the proofreading mode control corresponds to an input of a control button of an electronic pen or maintained input of the control button of the electronic pen.

8. A machine-readable non-transitory storage medium recording a program for performing the method of claim 2.

9. A portable terminal comprising the machine-readable non-transitory storage medium of claim 8.

10. The method of claim 1, wherein, in a proofreading operation according to the insertion proofreading mark, at least one of a size and a slope of the written content to be proofread is changed such that at least one of a size and a slope of a proofreading content to be inserted match a pre-input written content.

11. The method of claim 1, wherein, in a proofreading operation according to the replacement proofreading mark, at least one of a size and a slope of the written content to be proofread is changed such that at least one of a size and a slope of a proofreading content to replace a pre-input written content match the pre-input written content.

12. A method of writing content through a writing input on a touch screen, the method comprising:
   displaying written input content according to a writing input detection and identifying whether there is a proofreading mode control; and
   when there is the proofreading mode control:
   entering a proofreading mode,
   displaying the written input content according to the writing input detection,
   identifying a proofreading mark in the written input content, and
   applying an edit corresponding to the proofreading mark, so as to proofread the written content,
   wherein a type of edit applied is based on the proofreading mark,
   wherein the applying of the edit based on the proofreading mark includes removing the proofreading mark after the edit is applied while maintaining the edit,
   wherein the proofreading mark includes at least one of an "insertion proofreading mark" indicating a content insertion, a "replacement proofreading mark" indicating a content replacement, a "slope proofreading mark" indicating proofreading of a slope of a part corresponding to a character string including a plurality of characters in the written content, and a "paragraph alignment proofreading mark" indicating a paragraph alignment, and
   wherein, in a proofreading operation according to the slope proofreading mark, a form connecting the character string including the plurality of characters in the written content by one line is recognized as the slope proofreading mark and the plurality of characters are moved and rotated in a direction matching slopes of the plurality of characters with a calculated slope of a guideline based on a stroke of the recognized slope proofreading mark as the guideline.

13. An apparatus for writing content through a writing input on a touch screen, the apparatus comprising:
an input detection panel configured to:
detect a writing input, and
identify whether there is a proofreading mode control;
a display panel configured to display written input content according to a detected writing input; and
a controller configured to, when there is the proofreading mode control:
enter a proofreading mode,
control to display the written input content according to the writing input detection,
identify a proofreading mark in the written input content, and
apply an edit corresponding to the proofreading mark, so as to proofread the written content,
wherein a type of edit applied is based on the proofreading mark,
wherein the applying of the edit based on the proofreading mark includes removing the proofreading mark after the edit is applied while maintaining the edit,
wherein, in a proofreading operation according to the insertion proofreading mark, the controller is further configured to change at least one of a size and a slope of the written content to be proofread such that at least one of a size and a slope of a proofreading content to be inserted match a pre-input written content, and
wherein, in a proofreading operation according to the slope proofreading mark, the controller is further configured to:
recognize a form connecting the character string including the plurality of characters in the written content by one line as the slope proofreading mark, and
move and rotate the characters in a direction making slopes of the characters become 0 based on a stroke of the recognized slope proofreading mark as a guideline.

14. The apparatus of claim 13, wherein the controller is further configured to:
enter the proofreading mode by controlling to display the written input content according to the writing input detection,
determine whether there is a matching proofreading mark in the written input,
proofread a current written input content according to a proofreading function corresponding to the proofreading mark and the written content to be proofread, and
control to display the proofread written input content.

15. The apparatus of claim 14, wherein the controller is further configured to:
determine whether there is the matching proofreading mark by identifying N strokes as the proofreading mark when entering a proofreading mode.

16. The apparatus of claim 15, wherein N is 1.

17. The apparatus of claim 14, wherein, when it is determined that there is the matching proofreading mark in the written input, the controller is further configured to:
set an area around the matching proofreading mark as a proofreading area, and
control display of the proofreading area while being expanded.

18. The apparatus of claim 14, wherein the proofreading mode control corresponds to selection of a menu item from a menu bar on a screen for a writing input to enter the proofreading mode.

19. The apparatus of claim 14, wherein the proofreading mode control corresponds to an input of a control button of an electronic pen or input maintenance of the control button of the electronic pen.

20. The apparatus of claim 13, wherein, in a proofreading operation according to the insertion proofreading mark, the controller is further configured to change at least one of a size and a slope of the written content to be proofread such that at least one of a size and a slope of a proofreading content to be inserted match a pre-input written content.

21. The apparatus of claim 13, wherein, in a proofreading operation according to the replacement proofreading mark, the controller is further configured to change at least one of a size and a slope of the written content to be proofread such that at least one of a size and a slope of a proofreading content to replace a pre-input written content match the pre-input written content.

22. An apparatus for writing content through a writing input on a touch screen, the apparatus comprising:
an input detection panel configured to:
detect a writing input, and
identify whether there is a proofreading mode control;
a display panel configured to display written input content according to a detected writing input, and
a controller configured to, when there is the proofreading mode control:
enter a proofreading mode,
control to display the written input content according to the writing input detection,
identify a proofreading mark in the written input content, and
apply an edit corresponding to the proofreading mark, so as to proofread the written content,
wherein a type of edit applied is based on the proofreading mark,
wherein the applying of the edit based on the proofreading mark includes removing the proofreading mark after the edit is applied while maintaining the edit,
wherein, in a proofreading operation according to the insertion proofreading mark, the controller is further configured to change at least one of a size and a slope of the written content to be proofread such that at least one of a size and a slope of a proofreading content to be inserted match a pre-input written content, and
wherein, in a proofreading operation according to the slope proofreading mark, the controller is further configured to recognize a form connecting the character string including the plurality of characters in the written content by one line as the slope proofreading mark and to move and rotate the characters in a direction matching slopes of the characters with a calculated slope of a guideline based on a stroke of the recognized slope proofreading mark as the guideline.

* * * * *